Nov. 16, 1926.
W. C. MORRILL
SAW SET
Filed Nov. 9, 1922
1,607,134
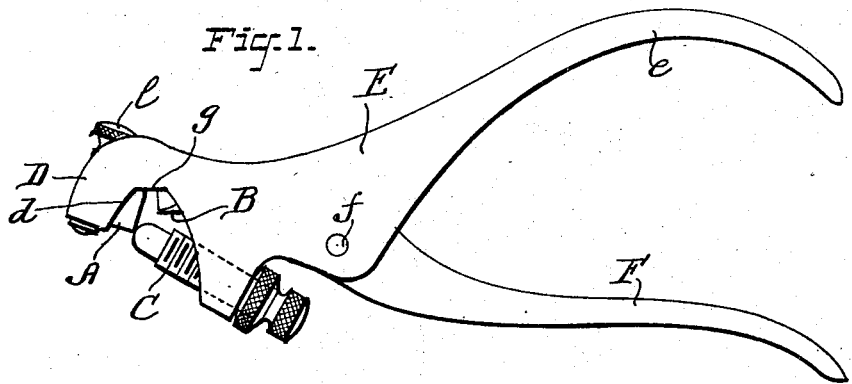
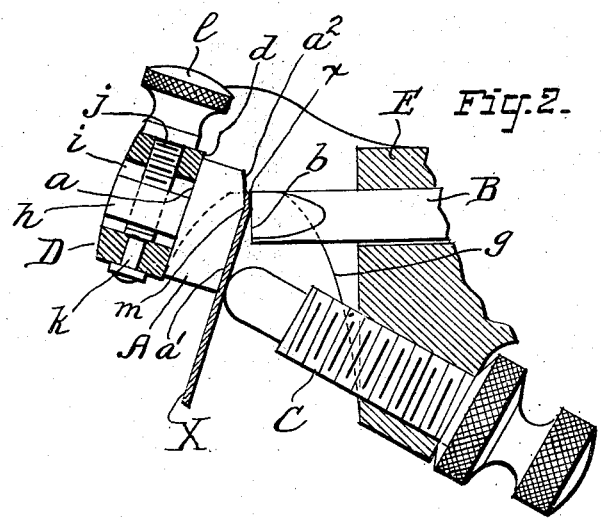
INVENTOR
William C. Morrill
BY
ATTORNEY Patented Nov. 16, 1926.

1,607,134

UNITED STATES PATENT OFFICE.

WILLIAM C. MORRILL, OF NEW YORK, N. Y.

SAW SET.

Application filed November 9, 1922. Serial No. 599,753.

This invention is an implement adapted to be operated by hand for performing the function of setting the teeth of a hand saw at a desired angle to the plane of the saw blade.

Implements of this general character, as heretofore constructed, have embodied either a slidable anvil or a rotatable anvil positioned in an operative relation to the head of a frame and to a reciprocatory plunger.

When a slidable anvil is used as a part of the implement, it is positioned into contact with a seat or face in a part known as the head of the implement frame, but as heretofore constructed, the said anvil seat on said frame head is in a plane at a right angle to the axis of the plunger, the end face of the plunger and one of the two faces of the anvil opposite to said end plunger face being parallel, it being apparent also that the seat or face of the frame head is parallel to the end face of the plunger. The anvil is provided in the surface next to the plunger end with a bevel and with the described face parallel to the plunger end, thus resulting in a shoulder in the anvil intermediate the bevel and that face parallel to the plunger end. In the operation of the tool, the saw blade is positioned intermediate the parallel faces of the plunger end and the anvil, and the plunger is forcibly pressed toward the saw blade, with the result that the saw blade is set over the shoulder on the anvil and does not, as a matter of fact, come into contact with the bevel on the anvil. Owing to the relation of the anvil to the frame head and to the plunger, the saw blade cannot in the operation of the implement be brought into contact with the bevel on the anvil, and could such result follow the movement of the plunger, the blade would produce too great a set in the tooth, with the result that the metal would be fractured and the tooth broken out of the blade. It follows that in the operation of setting a tooth, the saw blade does not have a surface, but only an edge, to rest against when the plunger is operated, and as a result of the plunger movement the tooth does not acquire as definite a set of inclination to the blade as it is desired should be given thereto, in consequence of which the blade has a tendency to spring back, or, as it is known, to "wobble", the effect of which is to impart a wave-like appearance to the blade when viewed at the edge thereof, this being the case more particularly in connection with thin hand saws.

The tendency to impart a wavy appearance to the saw blade in the operation of setting the teeth applies also to the use of implements with a rotatable anvil, for the reason that the circular or disk like contour of such rotatable anvils gives a concave set to the teeth and springs the blade of the saw out of line.

The object of this invention is to give to the tooth a definite angle of set, to preclude fracture of the tooth or breaking it out of the blade, to avoid distortion or buckling of the blade, and to produce an instrument of simple, substantial structure, easy of operation, and economical of manufacture.

Structurally considered, the implement embodies a frame provided with a head, a plunger, and an anvil, the latter being slidably fitted to the seat or face of said frame head; but in contradistinction to prior devices of this class, the seat or face provided in the frame head for the reception of the anvil is disposed at an angle to the longitudinal axis of the plunger, rather than parallel thereto, as heretofore. The anvil is fitted into contact with this inclined face or seat of the frame head, and is slidable with respect thereto, as a result of which organization of the anvil relative to the frame head said anvil occupies a position bodily inclined to the end face of the plunger. Furthermore, the anvil in my implement is reversed in position to that which anvils in prior implements occupied with relation to the plunger, i. e., the position of the anvil is shifted or reversed for the bevel of said anvil to lie opposite, or substantially opposite, to the end face of the plunger, and the shoulder of said anvil is directly opposite to the plunger face.

The anvil and the plunger are mutually adapted one to the other in a manner to bring into service the entire surface of the anvil opposite to the plunger face, and thus the saw blade rests upon or into contact with the whole surface of the anvil upon operation of the plunger, rather than permitting the blade to rest upon an edge in the tooth-setting operation. The result is that in setting a tooth, the plunger acts thereon to press the tooth itself into contact with the beveled surface of the anvil, and the relation of the anvil to the frame head and to the plunger are such that the frame head does not interfere with the saw blade no matter what the angle of the anvil faces may be. As a result of using my new implement, the tooth is given a decided definite angle of set relatively to the blade, the tooth cannot be broken out of the blade, and the blade itself is not buckled or distorted, all due to the relation of the anvil to the plunger in a manner to attain a firm bearing surface for the same during the operation of setting the teeth.

In the drawings,—

Figure 1 is a side elevation of my improved saw set.

Figure 2 is a sectional elevation with parts enlarged and showing the saw blade and a tooth thereof in contact with the bearing surfaces of the anvil in the operation of giving to the tooth a decided definite angle of set.

A designates the anvil, B the plunger, C the gage screw ordinarily used, and D the head of a frame E, the latter having a handle $e$ and affording a support for the pivot $f$ of a movable handle or lever F by which reciprocatory movement is given as usual to the plunger B. As usual in implements of the slidable anvil type, the frame and the head are recessed or cut away at $g$ to produce a throat for the reception of the saw blade, indicated at X in Figure 2, one tooth of said blade being indicated at $x$ as having been set over against the anvil A by this action of the plunger.

The inner surface of the head D indicated at $d$ in Figure 2 constitutes the seat or face on the head provided for the reception of the anvil, but in my improved implement, this seat or face $d$ is at an angle to the longitudinal axis of plunger B, so that this seat or face $d$ occupies an inclined relation with respect to the end face $b$ of the plunger, B, see Fig. 2.

The anvil is a solid block of metal, usually hardened steel, said anvil block having parallel faces $a$ $a'$ and a bevel $a^2$. The anvil is positioned within the recessed frame member E for the face $a$ of said anvil to bear against the seat of face $d$ of the frame head D, and thus the anvil assumes a bodily inclined relation to the axis of the plunger. The face $a'$ of the anvil is parallel to the seat or face $d$ of the frame head and is at an angle to the end face $b$ of the plunger. The anvil face $a'$ and the bevel $a^2$ meet to produce a shoulder $m$ on that face of the anvil opposite to the end face $b$ of the plunger, and the shoulder of such anvil is thus positioned in opposing relation to said plunger face $b$. The anvil is positioned within the frame member E and the head D thereof, for the beveled face $a^2$ of said anvil to be remote to the entrance of the throat $g$, in other words, the bevel of said anvil faces toward the closed side of the frame member E rather than toward the entrance to the throat $g$, as heretofore, thus resulting in my new implement in a reversed arrangement of the anvil with respect to the end of the plunger and to the throat $g$, it being usual heretofore to position the anvil so that its bevel faces toward the throat $g$ into which the saw blade is inserted.

To use the implement, the saw blade X is inserted as usual into the throat $g$ between the anvil on one side and the plunger and gage screw on the other side of the throat; but in my device the saw blade is in contact with the bearing face $a'$ of the anvil throughout the entire width and length of said face, rather than in contact, merely, with the shoulder $m$ on the anvil between the face $a'$ and bevel $a^2$, it being noted that the tooth $x$ extends between the end face of the plunger and the bevel $a^2$ of the anvil. The plunger is now operated as usual, the effect of which is to forcibly impel the end face $b$ of said plunger into contact with the metal and in a manner to press the tooth $x$ into contact with the bevel $a^2$ of the anvil. The saw during the tooth setting operation bears firmly against the face $a'$ of the anvil, being held thereagainst by the gage screw C, and thus the saw blade is not buckled or distorted by the pressure of the plunger in imparting the desired set to the tooth. The saw blade thus rests firmly against the anvil and the saw tooth is set over by the plunger into contact with the bevel of the anvil, whereby the tooth is set without the possibility of buckling the blade. Furthermore, the plunger and the anvil mutually cooperate to impart a definite and decided angle of set to the tooth, the angle of inclination of which tooth setting is determined by the angle of inclination of the bevel $a^2$ to the end face of the plunger.

The depth of set of the tooth is determined by the relation of the shoulder on the anvil to the end face of the plunger, and the depth of set is controllable by a sliding adjustment of the anvil relatively to the plunger in a manner to vary the position of the anvil shoulder with respect to the width of the end face of the plunger. Suitable means are provided for effecting the sliding movement of the anvil upon the seat or face $d$ of the frame head; as shown, the anvil is provided with a lug $h$, which fits slidably in a slot $i$ of the frame head, and into this lug $h$ is screwed an adjusting spindle or screw $j$, the latter having a swiveled bearing at $k$ in the frame head and being provided with a milled knob $l$ for its convenient rotation by the fingers of the operator. The rotation of the spindle in one direction acts on the anvil to impart sliding movement thereto upon and in contact with the inclined face or seat $d$ of the frame head, thus shifting the anvil so as to change the relation of the anvil shoulder m to the width of the plunger end face b, but a reverse rotation of the screw spindle adjusts the anvil in an opposite direction and effects a corresponding change in the position of the anvil shoulder relatively to the plunger end, whereby different depths of set may be given to the saw tooth.

Having thus fully described the invention, what I claim as new and desire to secure by Letters Patent is:

1. In a saw set, a plunger the operating end face of which is at a right angle to the longitudinal axis of said plunger, a non-rotatable anvil provided with a bevel constituting a seat for a saw tooth and with a face constituting a seat for a saw blade, said anvil being bodily positioned at an angle to the longitudinal axis of the plunger, and said angularly positioned anvil and the plunger being arranged relatively for the square end of said plunger to extend transversely across the line dividing the saw tooth seat from the saw blade seat of the anvil, and means for shifting the anvil bodily and in a rectilinear path with respect to the plunger.

2. In a saw set, a plunger the operating end face of which is at a right angle to the longitudinal axis of said plunger, a non-rotatable slidable anvil positioned for its axis to lie at an angle to the longitudinal axis of the plunger, said anvil being provided with a bevel constituting a saw tooth seat and provided also with a face constituting a seat for the saw blade, the square end of said plunger extending across a line dividing the saw tooth seat from the saw blade seat of the angularly positioned anvil, and means for bodily shifting said anvil in a rectilinear path with respect to the end face of said plunger.

3. In a saw set, a frame provided with an anvil-seat, a plunger the end face of which is at a right angle to the axis of said plunger, said anvil-seat of the frame being inclined relatively to the end face of the plunger and the angle of said inclination corresponding to the angle of set to be given to a saw tooth, a non-rotatable anvil block positioned into contact with said anvil-seat, whereby the anvil block is bodily inclined to the end face of said plunger, said anvil block being provided on the side adjacent the plunger end with a flat face constituting a seat for a saw blade and provided, also, with a bevel constituting a seat for a saw tooth, and means for bodily shifting in a rectilinear path the anvil block relatively to the plunger-end-face and thereby change the relationship of the respective seat faces on said anvil block with reference to the plunger-end-face for controlling the depth of set of a saw tooth.

4. In a saw set, a plunger, a frame head provided with an anvil seat or face positioned at an angle to the longitudinal axis of the plunger, a non-rotatable anvil occupying said inclined seat or face of the frame head, said anvil being provided with a saw-seat face and with a bevel constituting a tooth seat, and means for imparting sliding movement to the anvil with respect to the seat or face of the frame head and to the end face of the plunger.

5. In a saw seat, a frame-head provided with an anvil seat, a plunger the operating end face of which is of square formation, a non-rotatable slidable anvil in contact with the anvil seat of said frame head and bodily inclined to the square ended plunger, said anvil being provided with a bevel constituting a saw tooth seat and with a face constituting a saw blade seat, said anvil and the plunger being relatively positioned for the square ended plunger to extend transversely across a line dividing the saw tooth seat from the saw blade seat of said anvil, and means for bodily moving the anvil in a rectilinear path and with respect to the square end of said plunger.

6. In a saw set, the combination of a frame head provided with an anvil seat, a plunger, said anvil seat being inclined to the longitudinal axis of the plunger, a non-rotatable anvil occupying said inclined face of the frame head, said anvil being provided with a saw blade seat and with a bevel, means for retaining a saw blade into contact with the saw blade seat of the anvil, and means for imparting slidable movement to the anvil for changing the relation of the faces of said anvil to the end face of said plunger.

7. In a saw set, a frame, a plunger having a right angular end face, a non-rotatable anvil block positioned opposite to the end face of the plunger and inclined bodily with respect to the axis of the plunger, the angle of inclination of said anvil block corresponding to the angle of set adapted to be imparted to a saw tooth, said anvil block being provided with a flat face constituting a seat for a saw blade and with a bevel constituting a seat for a saw tooth, there being a line of demarcation intermediate said flat face and said bevel on the anvil block, and means for moving in a rectilinear path the anvil block with reference to the square end face of the plunger, whereby the line of demarcation of the anvil block is adapted to be changed with reference to the end face of the plunger and thus provide for a variation in the depth of set of a saw tooth.

In testimony whereof I have hereunto signed this specification at the State of New York, this 8th day of November 1922.

WILLIAM C. MORRILL.